United States Patent
Mahlein et al.

(10) Patent No.: US 6,496,343 B2
(45) Date of Patent: Dec. 17, 2002

(54) OVERVOLTAGE PROTECTION APPARATUS FOR A MATRIX CONVERTER

(75) Inventors: Jochen Mahlein, Karlsruhe (DE); Walter Springmann, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 09/778,143

(22) Filed: Feb. 7, 2001

(65) Prior Publication Data

US 2001/0026427 A1 Oct. 4, 2001

(30) Foreign Application Priority Data

Feb. 8, 2000 (DE) .......................... 100 05 449

(51) Int. Cl.[7] .............. H02H 3/20; H02H 9/04; H02H 3/22
(52) U.S. Cl. .................. 361/91.1; 361/111; 361/56
(58) Field of Search .................. 361/91.1, 111, 361/20, 56; 307/113

(56) References Cited

U.S. PATENT DOCUMENTS

| | | | | | |
|---|---|---|---|---|---|
| 4,901,183 A | * | 2/1990 | Lee | .............. | 361/56 |
| 5,136,455 A | * | 8/1992 | Billingsley | .............. | 361/56 |
| 5,157,572 A | * | 10/1992 | Bird | .............. | 361/56 |
| 5,909,367 A | * | 6/1999 | Change | .............. | 361/163 |

* cited by examiner

Primary Examiner—Stephen W. Jackson
Assistant Examiner—Z Kitov
(74) Attorney, Agent, or Firm—Baker Botts LLP

(57) ABSTRACT

An overvoltage protection apparatus for a matrix converter has nine bidirectional power switches which are arranged in a 3×3 switch matrix. The overvoltage protection apparatus has three varistors on both the network side and the load side, which are each connected, in delta, to input and output connections of the matrix converter. A result, the overvoltage protection apparatus has considerably reduced physical volume, as a result of which the component costs for the overvoltage protection apparatus are very low.

8 Claims, 2 Drawing Sheets

OVERVOLTAGE PROTECTION APPARATUS FOR A MATRIX CONVERTER

BACKGROUND OF THE INVENTION

The invention relates to an overvoltage protection apparatus for a matrix converter having nine bidirectional power switches arranged in a 3×3 switch matrix.

A matrix converter is a self-commutated direct converter. This self-commutated direct converter is a frequency converter without an intermediate circuit. The three input phases are connected to the three output phases by means of an arrangement of electronic power switches in a 3×3 switch matrix. Such a self-commutated direct converter offers the advantage that, by virtue of the topology, it has a feedback capability and produces sinusoidal mains currents by means of appropriately defined control. The bidirectional switches in the switch matrix can be semiconductor switches integrated in a diode bridge, or can be two back-to-back, series-connected semiconductor switches. The two back-to-back series-connected semiconductor switches in a bidirectional power switch of the switch matrix can be configured using either a common emitter mode topology or a common collector mode topology. An insulated gate bipolar transistor (IGBT) is preferably used as the semiconductor switch. The actuation of the semiconductor switches in the power switches of the switch matrix in each case produces a current path in a direction governed by the arrangement of the semiconductor switches. If both semiconductor switches are actuated, current is allowed to flow in both directions, such that a reliable electrical connection is produced between an input phase and an output phase. If only one semiconductor switch of the bidirectional power switch of the switch matrix is actuated, then this results in a connection in only one preferred current direction. One phase of the matrix converter is an arrangement of three bidirectional power switches, which produces a connection from the three main phases to a respective one of the output phases.

Since the matrix converter does not have any passive freewheeling circuits, as in the case of an intermediate-circuit voltage converter, the inductances which are present in the circuit can cause high reverse voltages to occur across the semiconductor switches, particularly in the event of a pulse interruption generated on the basis of an EMERGENCY OFF (disconnection of the actuation pulses from all the semiconductor switches). These overvoltages can also occur as a consequence of an incorrectly initiated commutation sequence or due to the failure of the actuation of bidirectional power switches. In the aforementioned situations, the output circuit is always interrupted. The interruption of the output circuit in conjunction with the inductances which are present in the circuit causes the overvoltages, which can lead to destruction of the semiconductor switches.

An overvoltage protection apparatus is known from the publication "Novel Solutions for Protection of Matrix Converter to Three Phase Induction Machine" printed in the Proceedings of the "IEEE Industry Applications Society Annual Meeting", New Orleans, La., Oct. 5–9, 1997, pages 1447 to 1454. FIG. 1 shows a matrix converter 2, with this known overvoltage protection apparatus 4, in more detail. This overvoltage protection apparatus has two 6-pulse diode bridges 6 and 8 which are linked to one another on the DC-voltage side by means of a capacitor 10. On the AC-voltage side, the 6-pulse diode bridge 6 is connected to the input connections R, S, T of the matrix converter 2. On the AC-voltage side, the diode bridge 8 is connected to the output connections U, V, W of the matrix converter 2. A resistor 12 is connected electrically in parallel with the capacitor 10, and discharges the capacitor 10. An LC filter 14 is also connected to the input connections R, S, T of the matrix converter 2 and is linked on the input side to a three-phase main system 16. This LC filter 14, which is also referred to as the input filter, keeps pulse-frequency harmonics away from the main system 16. The size of this filter 14 depends on the pulse frequency of the matrix converter 2.

The matrix converter 2 has nine bidirectional power switches 18 which are arranged in a 3×3 switch matrix. The bidirectional power switches 18 may be, firstly, a semiconductor switch 22 integrated in a diode bridge 20 and, secondly, two back-to-back series-connected semiconductor switches 24 and 26. The two back-to-back series-connected semiconductor switches 24 and 26 are configured using the common emitter mode topology. An asynchronous machine 28 is connected to the output connections U, V, W of the matrix converter 2.

Any overvoltages which occur are rectified by the diode bridges 6, 8 and are passed to the capacitor 10. This capacitor 10 thus absorbs the commutation energy. This overvoltage protection apparatus 4, which is also the subject of U.S. Pat. No. 4,497,230, requires an initial charging circuit for the capacitor 10. This initial charging circuit is required in order that no overvoltages at double or triple the main voltage occur when the matrix converter 2 is switched on. Such overvoltages can cause high surge currents, which must be accommodated by the diodes in the diode bridge 6. The resistor 12 is designed such that a predetermined amount of energy is discharged from the capacitor 10. This amount of energy is dependent on a predetermined difference between the main voltage and the capacitor voltage.

The cited publication also describes a further overvoltage protection apparatus. This further overvoltage protection apparatus is based on the principle that the existing diodes in the bidirectional power switches can also be used for an overvoltage protection apparatus in order to allow reduction of the number of diodes connected to the connections R, S, T and U, V, W of the matrix converter. The publication also discusses an overvoltage protection apparatus for a matrix converter 2, which in each case has two back-to-back series-connected semiconductor switches 24 and 26 which serve as bidirectional power switches 18. The publication discusses this overvoltage protection apparatus for a matrix converter 2 in which bidirectional power switches 18 each use a semiconductor switch 22 integrated in a diode bridge 20. This overvoltage protection apparatus saves 6 diodes in comparison to the previously described overvoltage protection apparatus 4.

An overvoltage protection apparatus is likewise known from the publication "Performance of a two Steps Commutated Matrix Converter for AC-Variable-Speed Drives" printed in the proceedings of the EPE '99, Lausanne, September 1999, pages 1 to 9. The apparatus described in this publication has two 6-pulse diode bridges. Each of these two diode bridges has a capacitor on the DC-voltage side. The two capacitors are electrically connected in parallel. A zener diode and a pulse resistor are electrically connected in parallel with these two capacitors and are used to limit the voltage across the capacitors to a predetermined value. Furthermore, each bidirectional power switch has a varistor and a zener diode, which are used to limit the overvoltages across the bidirectional power switch.

The publication "A Matrix Converter without Reactive Clamp Elements for an Induction Motor Drive System" by Axel Schuster, printed in IEEE, 1998, pages 714 to 720, discusses the use of a number of varistors as the overvoltage protection apparatus. A varistor is connected electrically in parallel with each semiconductor switch in each bidirectional power switch in a 3×3 switch matrix. These 18 varistors protect the 18 semiconductor switches in the nine bidirectional power switches against overvoltages.

SUMMARY OF THE INVENTION

It is an object of the invention to provide an overvoltage protection apparatus having low component costs.

In accordance with the invention, this object is achieved by an overvoltage protection apparatus, comprising: (1) nine bidirectional power switches arranged in a 3×3 switch matrix; (2) first, second, and third varistors on a network side of a matrix converter, each of the first, second and third varistors being connected electrically in parallel with at least one of two input and output connections of the matrix converter; and (3) fourth, fifth, and sixth varistors on a load side of the matrix converter, each of the fourth, fifth, and sixth varistors being connected electrically in parallel with the at least one of the two input and output connections.

Since one varistor is in each case connected electrically in parallel with two input and output connections of the matrix converter, only six varistors are now required. When the load currents for the fed-back energy from the asynchronous machine are interrupted, this arrangement of the varistors offers a path for dissipating this energy. Furthermore, this arrangement of the varistors in the overvoltage protection apparatus protects two bidirectional power switches in the matrix converter against overvoltages, so that only six varistors are now required instead of eighteen. Thus, the overvoltage protection apparatus in accordance with the invention, which includes delta-connected varistors at the input and output connections of the matrix converter, has very low component costs. In comparison to conventional overvoltage protection systems, no additional diodes and no additional initial charging circuits are required for the novel system disclosed herein. Each additional component not only increases the cost of a matrix converter, but also enlarges its physical volume. Furthermore, the circuitry of the additional diodes increases the value of the inductances which are present in the circuit, resulting in a higher overvoltage.

The varistors can be of a commercially available type, and are inactive during normal operation. Only the parasitic capacitances of the components are significant. The losses produced by the charge-reversal processes in this case are insignificant.

In one advantageous embodiment of the overvoltage protection apparatus, a voltage clamping circuit is connected electrically in parallel with each semiconductor switch in the bidirectional power switches in the 3×3 switch matrix. This voltage clamping circuit protects the semiconductor switches in the bidirectional power switches against overvoltages by clamping the voltage across the semiconductor circuit to a predetermined value. This protection measure results in a switched-off semiconductor switch being controlled in a desaturation region. This results in losses being produced in the semiconductor switch, which are acceptable for a short-term load. Overvoltages are thus prevented from occurring across any of the semiconductor switches in bidirectional power switches.

Commercially available varistors do not offer a suitable resistance behavior until close to or beyond the maximum permissible control voltage of the semiconductor switch to be protected. When the reverse state is attained, an asymmetric reverse voltage split could occur between the semiconductor switches in the two bidirectional power switches, which could lead to the destruction of a semiconductor switch in one of the two bidirectional power switches. The use of a voltage clamping circuit in the semiconductor switches in each bidirectional power switch in the 3×3 switch matrix in the matrix converter limits any overvoltage which might otherwise occur across a semiconductor switch in a bidirectional power switch. There is a further increase in the reverse voltage across two series-connected bidirectional power switches which are protected by means of a varistor. During this voltage rise, either the voltage clamping circuit of one semiconductor switch in the second bidirectional power switch responds, or the varistor becomes conductive. If the varistor becomes conductive, the current is commutated from the semiconductor switches in the two bidirectional power switches onto the varistor, so that the power loss now occurs in the varistor. Furthermore, the reverse voltage is split approximately symmetrically between the two actuated semiconductor switches in the two bidirectional power switches.

This additional voltage clamping circuit does not enlarge the physical volume of the matrix converter since the voltage clamping circuit for each semiconductor switch is integrated in the associated drive unit for the semiconductor switches. The combination of the delta-connected varistors and the input and output connections of the matrix converter and of the voltage clamping circuits allows the operating range of the varistors to be shifted to preferable regions of their respective operating characteristics. In this configuration, the varistor operates at a voltage which may be above the maximum permissible reverse voltage of a semiconductor switch which is used. Each semiconductor switch in the bidirectional power switches in the matrix converter provides some additional protection, because such switches have the thermal property of absorbing energy, at least to a minor extent.

BRIEF DESCRIPTION OF THE DRAWINGS

The invention will be explained further by reference to the drawings which illustrate schematically an embodiment of an overvoltage protection apparatus according to the invention.

In FIGS. 1 and 2, identical components are provided with the same reference symbols.

DETAILED DESCRIPTION OF THE INVENTION

Figure 1:
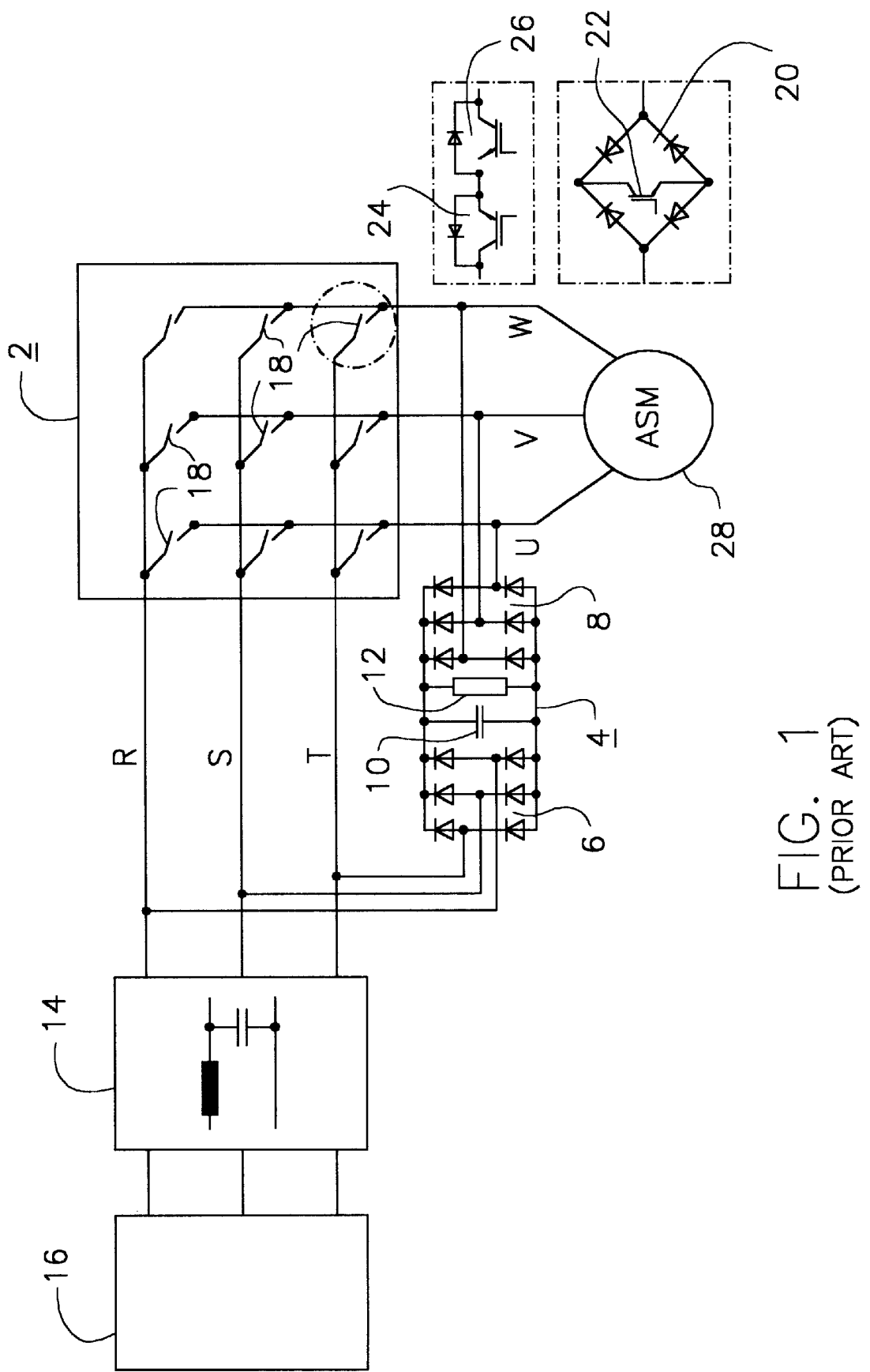
FIG. 1 is a schematic diagram which illustrates an overvoltage protection apparatus.
Figure 2:
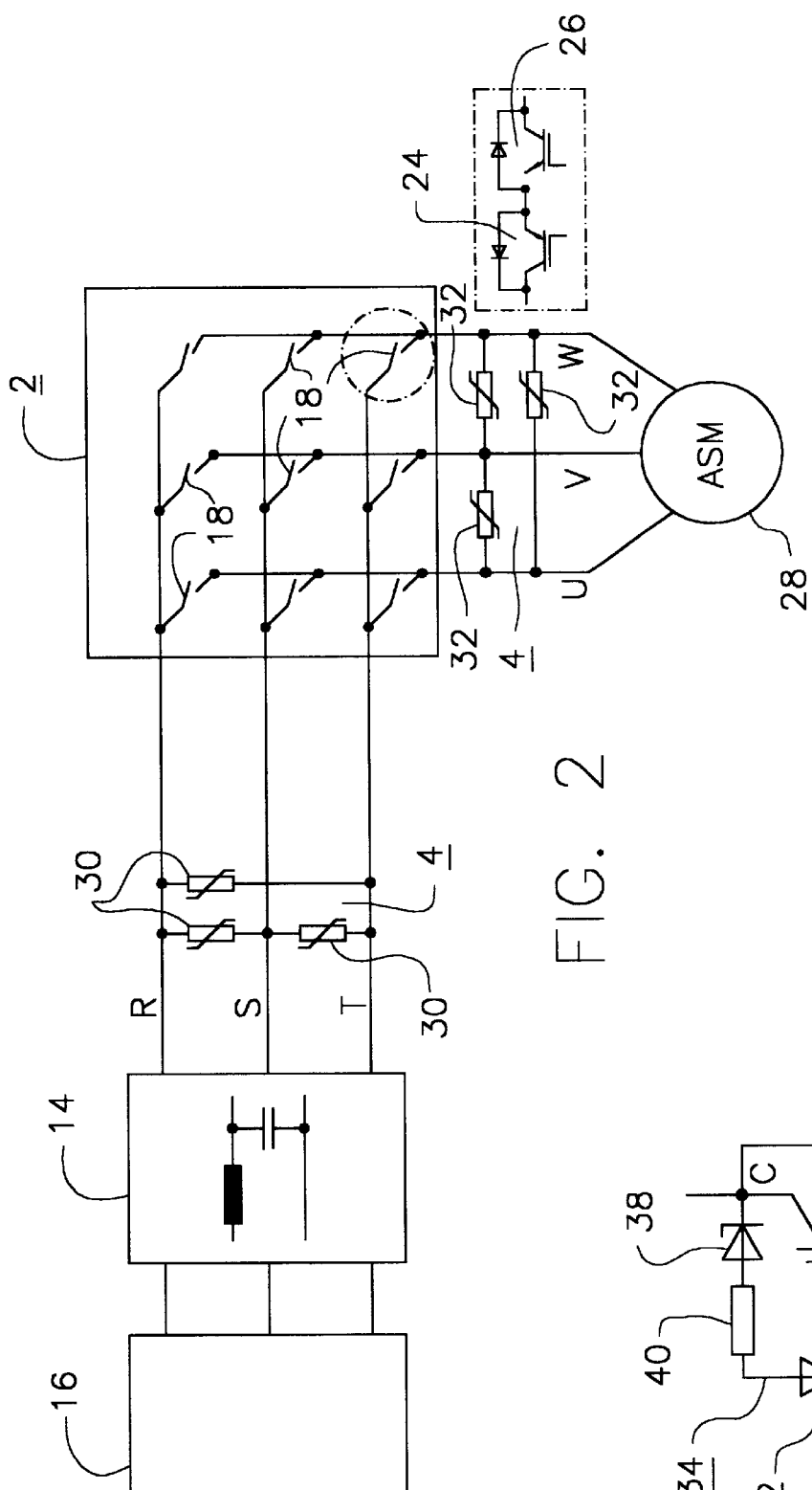
FIG. 2 is a schematic diagram which illustrates an embodiment of the overvoltage protection apparatus in accordance with the invention.

FIG. 2 illustrates the protection of a matrix converter 2 by an overvoltage protection apparatus 4 in accordance with the invention. This matrix converter 2 is likewise linked on the input side to a three-phase main system 16 by means of an LC filter 14. On the output side, an asynchronous machine 28 is connected to the output connections U, V, W of the matrix converter 2. The bidirectional power switches 18 are arranged in a 3×3 switch matrix. Each bidirectional power switch 18 has either two back-to-back series-connected semiconductor switches 24 and 26 or a semiconductor switch 22 integrated in a diode bridge 20. The overvoltage protection apparatus 4 has delta-connected varistors 30 and 32 at the input connections R, S, T and at the output connections U, V, W of the matrix converter 2. These varistors 30 and 32 can be of a commercially available type. Each varistor 30 or 32 is in each case electrically connected in parallel with two bidirectional power switches 18 in the matrix converter 2. In the "EMERGENCY OFF" fault condition described initially, in which all the semiconductor switches in the bidirectional power switches 18 in the matrix converter 2 are switched off, the varistors 30 and 32 each provide a current path for dissipating the small amount of energy fed back from the asynchronous machine 28. The overvoltage protection apparatus 4 thus prevents overvoltages from occurring across the semiconductor switches 24, 26 in the bidirectional power switches 18 in the matrix converter 2.

Figure 3:
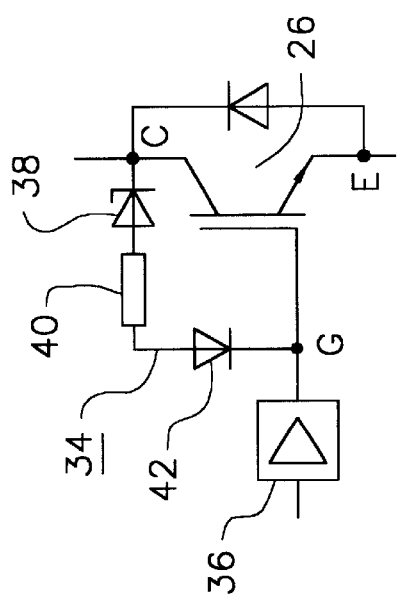
FIG. 3 is a schematic diagram which illustrates a voltage clamping circuit for a semiconductor switch in a bidirectional power switch of the matrix converter of FIG. 2.

FIG. 3 illustrates, in additional detail, a semiconductor switch 26 in a bidirectional power switch 18 in the matrix converter 2 as shown in FIG. 2. This semiconductor switch 26 is provided with a voltage clamping circuit 34. This voltage clamping circuit 34 is connected between the collector connection C and the gate connection G of the semiconductor switch 26. An Insulated Gate Bipolar Transistor (IGBT) is provided as the semiconductor switch 26, and a drive circuit 36 is connected to its gate connection G. This voltage clamping circuit 34 is known, for example, from the publication "Beschaltung von SIPMOS-Transistoren" [Circuitry for SIPMOS Transistors], printed in "Siemens Components", Volume 22, 1984, Issue 4, pages 157 to 159. This voltage clamping circuit 34 comprises a zener diode 38, preferably a high-voltage zener diode which is also referred to as a transit diode, a resistor 40 and a decoupling diode 42. The resistor 40 is used to limit the current flowing through the diodes 38 and 53. The decoupling diode 32 isolates the voltage clamping circuit 34 from the gate connection G of the semiconductor switch 26 when the semiconductor switch 26 is actuated. As soon as the collector-emitter voltage of the semiconductor switch 26 exceeds the total of the zener voltage of the transil diode 38, the threshold voltage of the decoupling diode 42, and the gate-emitter threshold voltage when the semiconductor switch 26 is in the switched-off state, the semiconductor switch 26 is actuated automatically. Any overvoltage which occurs across the semiconductor switch 26 is thus actively limited, with losses occurring in the semiconductor switch 26 and in the transil diode 38. The voltage clamping circuit 34 prevents voltage spikes from occurring across the semiconductor switches 24 and 26 in the bidirectional power switches 18 in the matrix converter 2. As discussed above, each varistor 30 and 32 is electrically connected in parallel with two bidirectional power switches 18 which are electrically connected in series. In the event of a fault, the inductances which are present in the circuit, and the fact that the matrix converter 2 has no passive freewheeling circuits, can cause an overvoltage to occur across the semiconductor switches in two bidirectional power switches 18. The overvoltage is limited to a predetermined value by means of the voltage clamping circuits across the semiconductor switches in the two bidirectional power switches 18. Once the reverse voltage has reached the response value of the associated varistor, the varistor draws the current, so that the power is now absorbed by the varistor. Furthermore, the proportions of the reverse voltages are distributed approximately symmetrically between the two semiconductor switches in the two series-connected bidirectional power switches 18, which are connected electrically in parallel with the current-carrying varistor. The combination of the varistor and voltage clamping circuit makes the matrix converter 2 more robust with respect to a pulse interruption in the event of an EMERGENCY OFF or in the event of an incorrectly initiated commutation sequence.

What is claimed is:

1. An overvoltage protection apparatus, comprising:
   nine bidirectional power switches arranged in a 3×3 switch matrix;
   first, second, and third varistors on a network side of a matrix converter, each of the first, second, and third varistors being connected electrically in parallel with at least one of two input and output connections of the matrix converter; and
   fourth, fifth, and sixth varistors on a load side of the matrix converter, each of the fourth, fifth, and sixth varistors being connected electrically in parallel with the at least one of the two input and output connections.

2. An overvoltage protection apparatus according to claim 1, wherein a voltage clamping circuit is connected electrically in parallel with a collector-gate path of each of a plurality of semiconductor switches in the bidirectional power switches.

3. An overvoltage protection apparatus according to claim 2, wherein the voltage clamping circuit comprises a series circuit comprising a zener diode, a resistor, and a decoupling diode.

4. An overvoltage protection apparatus according to claim 3, wherein the zener diode comprises a transit diode.

5. An overvoltage protection apparatus according to claim 1, wherein at least one of the bidirectional power switches comprises a semiconductor switch integrated in a diode bridge.

6. An overvoltage protection apparatus according to claim 1 wherein at least one of the bidirectional power switches comprises two back-to-back series-connected semiconductor switches.

7. An overvoltage protection apparatus according to claim 6, wherein the back-to-back series-connected semiconductor switches are configured in a common emitter mode topology.

8. An overvoltage protection apparatus comprising:
   nine bidirectional power/switches arranged in a 3×3 switch matrix; the bidirectional power switches comprising a semiconductor switch integrated in a diode bridge and at least one of the bidirectional power switches comprises two back-to-back series conducted semiconductor switches configured in a common emitter mode; a voltage clamping circuit electrically connected in parallel with a collector-gate path of each semiconductor switch in the bidirectional power switches, the voltage clamping circuit comprises a series circuit comprising a zener diode, a resistor and a decoupling diode, the zener diode of which comprises a transil diode;
   first, second, and third varistors on a network side of a matrix converter, each of the first, second, and third varistors being connected electrically in parallel with at least one of two input and output connections of the matrix converter; and
   fourth, fifth, and sixth varistors on a load side of the matrix converter, each of the fourth, fifth, and sixth varistors being connected electrically in parallel with the at least one of the two input and output connections.

* * * * *